Figure 1:
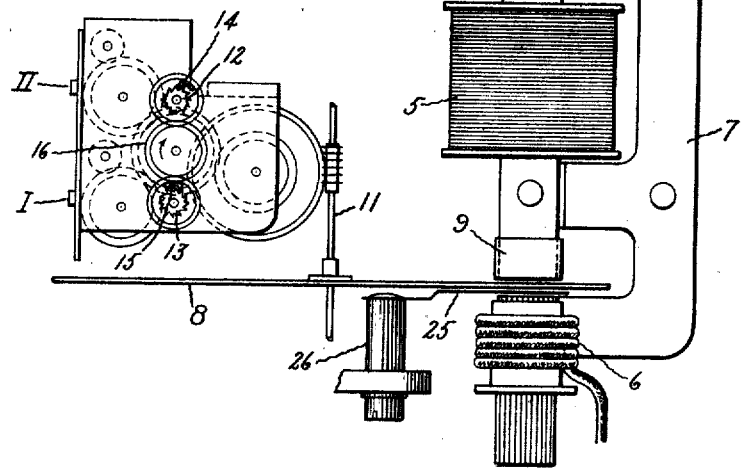

E. EVANS.
ELECTRIC METER.
APPLICATION FILED FEB. 10, 1914.

1,267,198.

Patented May 21, 1918.

Witnesses:

Inventor:
Evan Evans,
by Albert G. Davis
Attorney.

UNITED STATES PATENT OFFICE.

EVAN EVANS, OF BERLIN, GERMANY, ASSIGNOR TO GENERAL ELECTRIC COMPANY, A CORPORATION OF NEW YORK.

ELECTRIC METER.

1,267,198.  Specification of Letters Patent.  Patented May 21, 1918.

Application filed February 10, 1914. Serial No. 817,788.

*To all whom it may concern:*

Be it known that I, EVAN EVANS, a subject of the Emperor of Germany, residing at Berlin, Germany, have invented certain new and useful Improvements in Electric Meters, of which the following is a specification.

My invention relates to electric meters and particularly to maximum consumption or peak meters. More specifically my invention relates to that type of electric peak meter in which the armature is subjected to a constant countertorque corresponding to a definite and predetermined rate of consumption of energy.

The object of my invention is generally to improve the present type of peak meters, and particularly to provide a novel and improved registering system for such meters. More particularly the object of my invention is to provide a novel construction of peak meter peculiarly adapted for use in certain systems of metering and charging for electric energy.

In order to provide an equitable tariff rate for electric energy, it is common to designate for a particular consumer a certain predetermined contract rate of consumption of energy which the consumer should not exceed if he desires to avail himself of the most advantageous tariff rate for the energy consumed in his installation. In some instances the consumer is charged a definite amount independent of his actual energy consumption provided his rate of consumption of energy does not exceed a predetermined value. If, however, the rate of consumption of energy does exceed such predetermined value a registration is made of the excess amount of energy consumed when the rate of consumption exceeds such predetermined value, and a higher charge, in the nature of a penalty, is made for this excess amount of energy. For this purpose a meter is employed which registers only the energy consumed in excess of the contract limit when the rate of consumption of energy exceeds the predetermined contract value. No registration is thus obtained of the amount of energy consumed when the rate of consumption of energy is below the contract limit. The aim of my invention is to provide a novel registering system for a peak meter by means of which certain incidents of the consumer's demand on the central station, heretofore undeterminable, are readily ascertained.

In carrying out my invention, I provide an electric meter of the motor type having a rotatable member capable of rotation in a forward or backward direction. When the rate of consumption of energy is below the predetermined value the member rotates in a backward direction, and when the rate of consumption of energy exceeds the predetermined value the member rotates in a forward direction. The revolutions of the member in a forward direction are a measure of the amount of energy consumed in excess of the contract limit during the times that the rate of consumption of energy exceeded the predetermined value, and the revolutions of the member in a backward direction are a measure of the amount of energy within the contract limit which the consumer has not used. The rotatable member is operatively connected to two registers so that the revolutions in a forward and backward direction are separably recorded.

According to my present invention the actual consumption of energy under all conditions can be readily ascertained by a peak meter whose armature is subjected to a constant backward torque. This is accomplished by transmitting the backward rotary movement of the armature to a suitable registering device. This may be done in different ways. In certain instances it is advantageous to employ two registers and to record upon one only the revolutions of the armature in a forward direction and upon the other only the revolutions of the armature in a backward direction. In other instances another arrangement may be employed by which only the movement of the armature in one direction of rotation is transferred to one register, while the movement of the armature in both directions of rotation is transferred to the other register.

Figure 2:
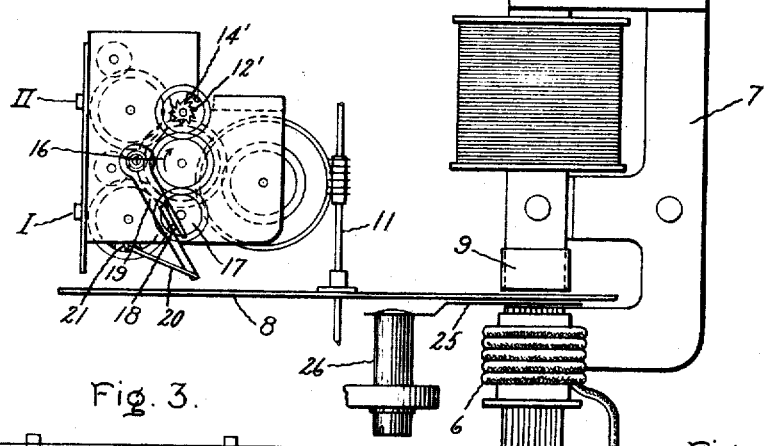
Figure 3:
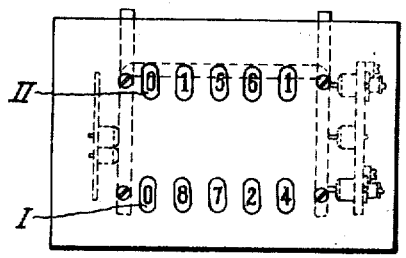
Figure 4:
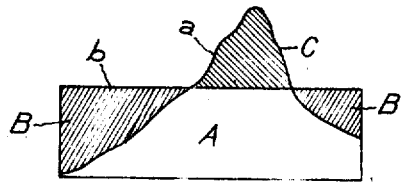

The features of my invention which I consider patentably novel are definitely indicated in the claims appended hereto. The mode of operation of electric meters embodying my invention will be readily understood from the following description taken in connection with the accompanying drawings, in which Figure 1 is a diagrammatic view of my invention embodied in a peak meter; Fig. 2 is a similar diagrammatic view illustrating a modified registering means; Fig. 3 is an elevation of the registers of the meters shown in Figs. 1 and 2, and Fig. 4 is an explanatory diagram.

The peak meter which I have employed for the purposes of illustration comprises a potential coil 5 and series coils 6 suitably arranged upon a mass of laminated magnetic material 7 forming a magnetic circuit of well known character for the potential and series fluxes. A disk armature 8, of the usual type, is rotatably arranged in an air gap of the magnetic circuit of the potential and series fluxes. A short-circuiting winding 9 surrounds a portion of the pole piece of the potential magnetic material. By means of the short-circuiting winding 9 two magnetic fields displaced in phase are produced. These fields pass through the disk armature 8 and impart to the armature a rotation in a backward direction. The torque producing this backward rotation is constant, and is, accordingly, independent of the magnitude of the rate of consumption of energy. This constant torque tending to produce backward rotation of the armature is subtracted from the torque tending to produce forward rotation of the armature, which latter torque is created whenever current flows in the series coils 6. It will, accordingly, be evident that when the rate of consumption of energy is below a predetermined value the armature 8 will rotate in a backward direction and the revolutions of the armature in this direction will be a measure of the difference between the amount of energy which would have been consumed in a certain period if the rate of energy consumption equaled the predetermined value during this entire period and the actual amount of energy consumed during the same period. The revolutions of the armature in a forward direction will be a measure of the amount of energy consumed in excess of the predetermined amount or contract limit during the times the rate of consumption of energy exceeded the predetermined rate.

The short-circuiting winding 9 may be of any desired form, and may consist of a piece of sheet metal embracing a portion of the cross sectional area of a pole piece of the potential magnetic circuit, or may consist of several turns of wire. To adjust the value of the constant torque tending to produce backward rotation of the armature the ohmic resistance of the short-circuiting winding 9 may be varied or its position on the pole piece altered. Further adjustment of the counter-torque may be obtained, if desired, by movement of a sheet metal vane 25, located in the air gap of the meter and parallel to the disk armature 8. The vane 25 is pivoted to a fixed post 26 and is adapted to be moved about this pivot. When the vane is symmetrically positioned with respect to the motive elements of the meter, it will have no effect on the rotation of the meter armature. When the vane is moved, however, out of this position of symmetry the currents induced therein will coöperate to produce a torque tending to turn the armature in one direction or the other depending on the direction of movement of the vane.

In accordance with my invention the backward and forward revolutions of the armature are separably registered, that is, these two revolutions are so registered upon suitable registers that the actual revolutions in a forward direction and the actual revolutions in a backward direction can be readily ascertained. In the arrangement illustrated in Fig. 1 of the drawings the revolutions of the armature in a backward direction are registered upon one register and the revolutions of the armature in a forward direction are registered upon another register. In the arrangement shown in Fig. 2 of the drawings, the revolutions of the armature in one direction are registered upon one register and the revolutions of the armature in both directions are registered upon a second register.

Referring first to Fig. 1 of the drawings, it will be seen that I have provided a construction whereby the revolutions of the armature 8 in a forward direction are registered on register II and the revolutions of the armature in a backward direction are registered on register I. The registers are actuated from the meter shaft 11 by the usual worm and gear trains. In accordance with the principle of my invention the register mechanism I is moved only when the armature is running backward, and the register mechanism II is moved only when the armature is running forward. This result is secured by providing ratchet wheels 12 and 13 between the respective register mechanisms and the gearing driven by the meter shaft. Pawls 14 and 15 coöperate respectively with the ratchets 12 and 13 and are secured to suitable gears positioned on opposite sides of a common driving gear 16. The pawls 14 and 15 will, accordingly, rotate in opposite directions. The gear 16 is driven by the meter shaft 11, and when this gear rotates in the direction indicated by the arrow in Fig. 1 pawl 15 slides freely over the teeth of the ratchet 13, while pawl 14 engages between the teeth of the ratchet 12 and actuates the mechanism of register II. While the gear member 16 rotates in this direction register II will be operatively connected to the meter shaft while register I will not be effected by the rotation of the meter shaft. When, however, the direction of rotation of the meter shaft is reversed the gear 16 will also have its direction of rotation reversed. Under such circumstances pawl 14 will slide idly over the teeth of ratchet 12 while pawl 15 will operatively engage in the teeth of ratchet 13 and thus actuate the mechanism of register I.

In the modified construction shown in Fig. 2 of the drawings, the gear 16 is driven by the meter shaft 11 as described in connection with Fig. 1. The gear 16 also drives a pawl 14' which is operatively related to a ratchet wheel 12'. When the gear 16 rotates in the direction indicated by the arrow the pawl 14' will engage in the teeth of the ratchet 12', as explained in connection with Fig. 1, and the revolutions of the meter shaft will be given by register II. If the direction of rotation of the meter shaft, and thus also of the gear 16, is reversed, the pawl 14' will slide idly over the teeth of ratchet 12'. The gear 16 also drives a gear 17 to which is secured an eccentrically positioned pin 18. The pin 18 is operatively arranged in a slot in a pivoted lever 19 and is adapted to move the lever through a certain angle when the gear 17 is rotated. An arm 20 secured to one end of the lever 19 operatively engages the teeth of a ratchet 21 secured to the mechanism of register I. It will thus be seen that the arm 20 always moves the ratchet 21 in the same direction regardless of the direction of rotation of the gear 17. In this way the sum of the revolutions of the armature 8 in a backward and forward direction are registered on register I.

It will of course be understood that the transference of the movement of the meter shaft to the register mechanisms may be effected in other ways than those herein described and illustrated. The essential feature of any construction for the transference of the movements of the meter shaft to the registers being that one of the registers indicates only the revolutions of the meter shaft in one direction while the other register gives a registration from which the revolutions of the meter armature in the other direction can be readily ascertained.

The application of my improved peak meter will be most readily understood from a consideration of Fig. 4. The irregular line $a$ indicates the demand curve of an installation. The top horizontal line $b$ designates the contract or predetermined rate of consumption of energy. The area included within the rectangle is thus a measure of the amount of energy which would be consumed in a certain period if the consumer's demand was uniformly equal to the predetermined rate of consumption of energy, which amount of energy may be designated the contract limit for the entire period. The cross-hatched portions of the rectangle represent the backward revolutions of the meter armature, and the area of these portions is a measure of the difference between the amount of energy which would have been consumed if the rate of consumption equaled the predetermined value and the actual amount of energy consumed, or in other words the amount of energy within the contract limit which was not used. The cross-hatched portion above the line $b$ indicates the amount of energy consumed in excess of that portion of the contract limit consumed during the times the rate of consumption of energy exceeded the predetermined value. This excess quantity is indicated by the forward revolutions of the meter shaft and is thus registered on register II.

If we assume the area of the rectangle to be represented by A, the area of the cross-hatched portions of the rectangle by B, and the area of the cross-hatched portion outside the rectangle by C we can readily see how the meters illustrated in Figs. 1 and 2 separably register the backward and forward revolutions of the meter shaft, and what these revolutions stand for. The revolutions of the meter shaft in a forward direction are represented by the area C and are directly given in both meters on register II. In the case of the meter of Fig. 1 register I gives directly an indication of area B, while in the case of the meter of Fig. 2 register I gives the sum of the backward and forward revolutions of the meter shaft and, accordingly, its reading represents (B+C). To obtain B, with the meter of Fig. 2, the reading of register II is subtracted from the reading of register I. It will be obvious that the actual amount of energy consumed within the whole contract limit is represented by (A−B). It will, accordingly, be seen that the total actual amount of energy consumed by the installation can be conveniently ascertained by my improved construction of meter, and is represented by the formula ((A−B)+C).

Numerous systems of metering in which my improved type of meter can be advantageously employed will be apparent to those skilled in the art. For the purposes of illustration I will briefly mention one system. The consumer is charged a definite amount for the use of electric energy with the understanding that his rate of consumption of energy should not exceed a predetermined value, but in the event that his rate of energy consumption does exceed this value that he will be charged a certain extra amount for energy consumed in excess of the contract limit when the rate of consumption exceeds the predetermined value. Further, the consumer is given a rebate on energy within the contract limit which he does not use. This rebate is nominal and has for its purpose to excite the consumer to be economical in his use of electric energy. According to this system of metering the consumer is charged a definite amount, say ten dollars per mouth, for the use of electric energy. He receives a rebate of a nominal amount, say one cent per kilowatt hour, for the energy represented by area B. And he pays extra, say five cents per kilowatt hour, for the energy represented by area C.

Numerous modifications embodying the principle of my invention will be apparent to those skilled in the art. I have herein illustrated two constructions of meter embodying my invention, but it will be understood that such illustrations are merely by way of example and that I do not desire to limit myself to the specific details of construction or the particular type of peak meter herein illustrated and described. I, accordingly, aim by the terms of the following claims to cover all such modifications as are within the spirit and scope of my invention.

What I claim as new and desire to secure by Letters Patent of the United States, is,—

1. An electric meter comprising a magnetic core, a rotatable armature in operative relation therewith, a potential coil surrounding said core adapted to produce a magnetic field in operative relation with the armature, means in operative relation to the core and armature displacing the phase of a portion of said field and causing the armature to rotate in a given direction when the consumption of energy is below a predetermined value, a series coil also surrounding the core and adapted to cause the armature to rotate in a reverse direction when the consumption of energy is above the predetermined value, two registers, and means whereby the revolutions of the armature in both directions are separably registered.

2. An electric meter comprising a magnetic core, a rotatable armature in operative relation therewith, a potential coil surrounding said core adapted to produce a magnetic field in operative relation with the armature, means in operative relation to the core and armature displacing the phase of a portion of said field and causing the armature to rotate in a given direction when the consumption of energy is below a predetermined value, a series coil also surrounding the core and adapted to cause the armature to rotate in a reverse direction when the consumption of energy is above the predetermined value, two registers, means whereby the revolutions of the armature in each direction are registered on one of the registers, and means whereby the revolutions of the armature in one direction only are registered on the other register.

3. An electric meter comprising a magnetic core, a rotatable armature in operative relation therewith, a potential coil surrounding said core adapted to produce a magnetic field in operative relation with the armature, means in operative relation to the core and armature displacing the phase of a portion of said field and causing the armature to rotate in a given direction when the consumption of energy is below a predetermined value, a series coil also surrounding the core and adapted to cause the armature to rotate in a reverse direction when the consumption of energy is above the predetermined value, two registers, a worm and gear wheel connected thereto in operative relation with the armature and adapted to reverse its direction with the direction of rotation of the armature, a gear train operating one of said registers, a ratchet wheel and pawl mechanism connecting said gear train to the gear wheel so that the register only registers for one direction of rotation of the gear wheel, a second gear train for operating the second register and a mechanism connecting said gear train to the gear wheel so that the second register registers for both directions of rotation of the gear wheel.

In witness whereof, I have hereunto set my hand this 19th day of January, 1914.

EVAN EVANS.

Witnesses:
 WOLDEMAR HAUPT,
 HENRY HASPER.